United States Patent Office 3,501,479
Patented Mar. 17, 1970

3,501,479
DIHYDROQUINOLINES AND SUBSTITUTED DIHYDROQUINOLINES AND METHOD OF PREPARING THE SAME
William Alan Remers, Suffern, and Gabriel Joseph Gibs, Pearl River, N.Y., and Martin Joseph Weiss, Oradell, N.J., assignors to American Cyanamid Company, Stamford, Conn., a corporation of Maine
No Drawing. Filed May 19, 1967, Ser. No. 639,602
Int. Cl. C07d 33/38
U.S. Cl. 260—289
8 Claims

ABSTRACT OF THE DISCLOSURE

Novel dihydroquinolines and ketotetrahydroquinolines which may have substituents in the 2-, 6- or 7-positions are described along with methods of preparing the same. These novel compounds are useful for their central nervous system activity.

SUMMARY OF THE INVENTION

This invention relates to dihydroquinolines and ketotetrahydroquinolines which can be represented by the following formula:

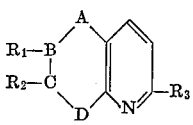

wherein $R_1$ is selected from the group consisting of hydrogen and lower alkoxy; $R_2$ is a member of the group consisting of hydrogen and lower alkoxy; with the proviso that at least one of $R_1$ and $R_2$ is hydrogen; $R_3$ is a member of the group consisting of hydrogen and lower alkyl;

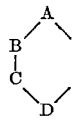

is a member selected from the group consisting of

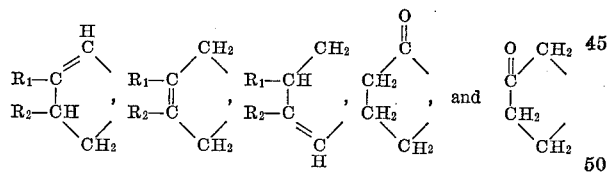

wherein $R_1$ and $R_2$ are as defined above; and the nontoxic acid addition salts thereof.

The compounds of this invention are, in general, colorless oils, soluble in aqueous acids and in the more common organic solvents, as for example, alcohol and ether. The acid addition salts of the compounds are solids and are soluble in water. The salts may be, for example, hydrochloride, hydrobromide, sulfate, maleate, and the like.

Certain of the novel compounds of this invention may be prepared by the reduction of the corresponding quinolines of the formula.

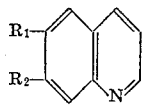

wherein $R_1$ and $R_2$ are as defined above, with an alkali metal such as, for example, lithium and an alcohol such as methanol, present in excess throughout the reduction, in liquid ammonia. The following specific example is illustrative of such general preparation; 6-methoxyquinoline (I) is reduced to a mixture of 5,8-dihydro-6-methoxyquinoline (II) and 7,8-dihydro-6-methoxyquinoline (III). The following equation illustrates the reaction

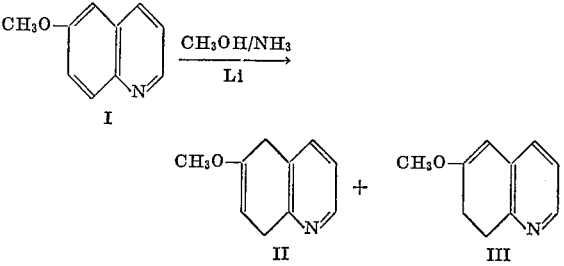

Upon heating at approximately 200° C., 5,8-dihydro-6-methoxyquinoline (II) is isomerized to 7,8-dihydro-6-methoxyquinoline (III). Treatment of the lower alkoxy dihydroquinolines thus prepared with an acid such as hydrochloric acid affords the corresponding ketotetrahydroquinolines, which are also a part of this invention. This preparation may be illustrated by the following examples:

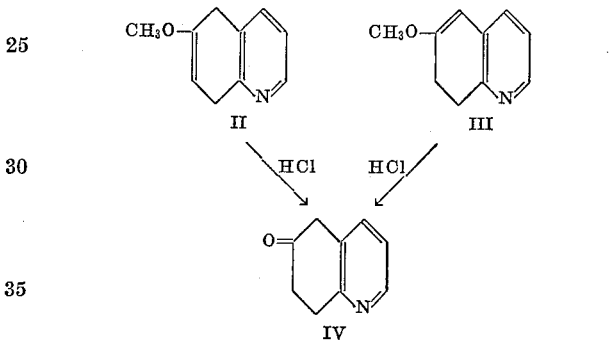

The 5-ketotetrahydroquinolines, such as VII, can be prepared by condensation of 1,3-cyclohexanedione (V) with a vinylketone such as methylvinylketone, followed by condensation of the resulting triketone (VI) with ammonia, and such compounds are also part of this invention.

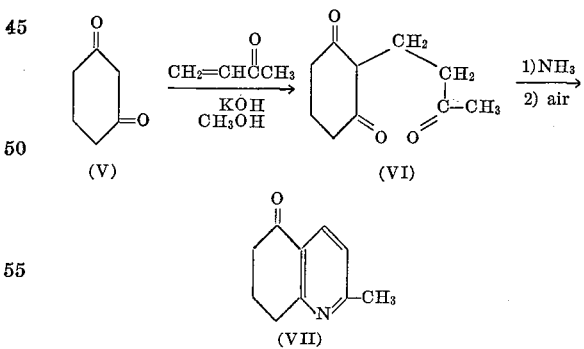

The reaction of quinoline and certain of its amino and nitro derivatives with sodium and ammonium halide salts has been previously reported [C. M. Knowles and G. W. Watt, J. Am. Chem. Soc., 65, 410 (1943); W. Hückel and L Hagedorn, Chem. Ber., 90, 752 (1957)]; however, in these examples, the reduction invariably occurred in the pyridine ring of the quinoline The method described in the present invention, wherein an alkali metal such as lithium is added to the quinoline compound in ammonia containing excess alcohol, such as methanol, gives reduction in the benzene ring and the novel dihydroquinoline products are distinctly different from the 1,2-dihydroquinoline and other products obtained by reduction of the pyridine ring with alkali metal and ammonium halide. For example, only hydrolysis of the benzene ring reduced products, such as II and III, produces the valuable keto derivative IV.

The novel compounds of this invention show a useful effect on the central nervous system (CNS) such as tranquilizer or anti-depressant activity.

A useful test for tranquilizer activity consists of measuring the reduction of spontaneous motor activity in animals by means of an actophotometer (a photoelectric device for quantitatively measuring locomotor activity). Graded doses of the active compounds are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

The anti-depressant properties of the compounds are evident by measuring their ability to counteract a depression induced in animals by the administration of tetrabenazine hexamate. Graded doses of the active compounds are administered to groups of mice, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show the well known profound depression induced by tetrabenazine. The results from several dose levels are used to establish effective dose ranges. The anti-depressant compounds show their desirable properties by this procedure at dose levels which produce little or no untoward reactions such as ataxia or reduced spontaneous motor activity.

The products of the present invention can be incorporated in various pharmaceutical forms, such as tablets, capsules, pills, and so forth, for immediate or sustained release, by combining with suitable carriers. The daily total dose may vary from 10 mg. to 1000 mg. Similarly, the single dosage unit may vary from 5 mg. to 200 mg. They may be in the form of dosage units for single therapeutic dose or in small units for multiple doses or in larger units for division into single doses. Obviously, in addition to the therapeutic agent, there may be present excipients, binders, fillers and other therapeutically inert ingredients necessary in the formulation of the desired pharmaceutical preparation.

DETAILED DESCRIPTION

The following examples describe in detail the preparation of representative dihydroquinolines and ketotetrahydroquinolines of this invention.

EXAMPLE 1

Preparation of 5,8-dihydro-6-methoxyquinoline (II) and 7,8-dihydro-6-methoxyquinoline (III)

A mixture of 100 g. of 6-methoxyquinoline (I), 800 ml. of methanol, and 5 l. of liquid ammonia is treated with 22 g. of lithium, added portionwise. After evaporation of the ammonia, the methanol is removed under reduced pressure and the residue is treated with water and methylene chloride. The organic layer is washed with water, dried, and concentrated. The residual oil is first distilled with simple apparatus and the distillate is then carefully fractionated with a spinning-band column. The procedure affords in 26% yield a mixture of 5,8 - dihydro-6-methoxyquinoline (II) and 7,8 - dihydro-6-methoxyquinoline (III), boiling point 141–143° C. at 8 mm. This mixture is resolved by liquid-liquid partition chromatography on diatomaceous earth with a heptane/ 2-methoxyethanol system into the pure isomers. The 5,8-dihydro-6-methoxyquinoline (II) has $\lambda$max. 6.0$\mu$; 269 m$\mu$ ($\epsilon$ 4,100), and the 7,8-dihydro-6-methoxyquinoline (III) has $\lambda$max. 275 m$\mu$ and gives a picrate, melting point 164–168° C., on treatment with picric acid. If the fractional distillation is carried out over several days, the conversion of II into III can be observed by changes in the UV, IR, and nmr spectra of the mixture.

EXAMPLE 2

Preparation of 5,8-dihydroquinoline

Treatment of quinoline by the procedure described in Example 1 gives, without partition chromatography, 5,8-dihydroquinoline, which produces a picrate of melting point 167–169° C. on treatment with picric acid.

EXAMPLE 3

Preparation of 5,8-dihydro-7-methoxyquinoline

Treatment of 7-methoxyquinoline [J. Chem. Soc., 1947, 437] by the procedure described in Example 1 gives 5,8-dihydro-7-methoxyquinoline, $\lambda$max. 6–1$\mu$; 269 m$\mu$.

EXAMPLE 4

Preparation of 6-keto-5,6,7,8-tetrahydroquinoline (IV)

A solution in 1.0 liter of N/3 hydrochloric acid of 11.6 g. of the mixture of 5,8-dihydro-6-methoxyquinoline and 7,8-dihydro-6-methoxyquinoline obtained from the distillation described in Example 1 is kept at 25° C. for 5 hours, and then is treated with excess sodium hydroxide solution. The alkaline solution is extracted with methylene chloride and the extract is dried and concentrated. Distillation of the residual oil affords 2.63 g. of 6-keto-5,6, 7,8-tetrahydroquinoline as a colorless oil, boiling point 138° C. at 4 mm.

EXAMPLE 5

Preparation of 5-keto-2-methyl-5,6,7,8-tetrahydroquinoline (VII)

To a solution of 5.6 g. of 1,3-cyclohexanedione (V) in 20 ml. of methanol containing 2.7 g. of potassium hydroxide is added 3.5 g. of methylvinylketone. After 5 days, the resulting solution is concentrated and the residual syrup is washed with methylene chloride, acidified, and then extracted with methylene chloride. This extract, upon concentration, gives 6.3 g. of pale yellow oil, $\lambda$max. 5.85, 6.25$\mu$. This oil is combined in a steel pressure vessel with 20 ml. of methanol containing 2.4 g. of ammonia and the mixture is heated at 150° C. for 40 hours. It is then concentrated and the residual oil is purified by partition chromatography on a diatomaceous earth column with a heptanemethanol-ethylacetate-water solvent system. This procedure affords 2.3 g. of 5-keto-2-methyl-5,6,7,8-tetrahydroquinoline as a yellow oil $\lambda$max. 5.95$\mu$; 240, 282, 290 m$\mu$.

What is claimed is:

1. A quinoline selected from those of the formulae:

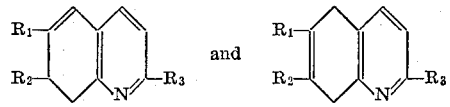

wherein $R_1$ and $R_2$ are selected from the group consisting of hydrogen and lower alkoxy, at least one of which is hydrogen; $R_3$ is selected from the group consisting of hydrogen and lower alkyl and non-toxic acid addition salts thereof.

2. The quinoline according to claim 1: 5,8-dihydro-6-methoxyquinoline.

3. The quinoline according to claim 1: 7,8-dihydro-6-methoxyquinoline.

4. The quinoline according to claim 1: 5,8-dihydroquinoline.

5. The quinoline according to claim 1: 5,8-dihydro-7-methoxyquinoline.

6. A method of preparing a dihydroquinoline of the formula:

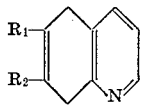

wherein $R_1$ and $R_2$ are selected from the group consisting of hydrogen and lower alkoxy, one of which is hydrogen which comprises contacting a quinoline of the formula:

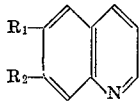

wherein $R_1$ and $R_2$ are as defined above, with an alkali metal in the presence of liquid ammonia containing a lower alkanol and recovering said dihydroquinoline therefrom.

7. A method of preparing dihydroquinolines, reduced in the benzene ring, according to claim 6, wherein the alkali metal is lithium.

8. A method according to claim 6, wherein the alkali metal is lithium and the lower alkyl alcohol is methanol.

References Cited

UNITED STATES PATENTS

| | | | |
|---|---|---|---|
| 2,231,705 | 2/1941 | Dickey | 260—289 X |
| 3,015,661 | 2/1962 | Georgian | 260—286 X |
| 3,141,888 | 7/1964 | Loev | 260—289 |
| 3,282,944 | 11/1966 | Walker et al. | 260—287 |
| 3,379,730 | 4/1968 | Mathlson | 260—286 |

OTHER REFERENCES

Chem. Abstr. January-June 1963 subject index p. 1917 S.

DONALD G. DAUS, Primary Examiner

U.S. Cl. X.R.

260—286, 586; 424—258